United States Patent [19]
Amatsutsu et al.

[11] Patent Number: 5,950,369
[45] Date of Patent: Sep. 14, 1999

[54] CONNECTING TUBULAR BODY FOR HANDHOLE OR MANHOLE, BLOCK BODY FOR THE TUBULAR BODY, AND HANDHOLE OR HANDHOLE STRUCTURE

[75] Inventors: Hiroyuki Amatsutsu; Yasuhiro Kikumori, both of Osaka, Japan

[73] Assignee: Totaku Industries, Inc., Tokyo, Japan

[21] Appl. No.: 09/075,256

[22] Filed: May 11, 1998

[30] Foreign Application Priority Data

May 12, 1997  [JP]  Japan ..................................... 9-137758

[51] Int. Cl.$^6$ .................................................. E02D 29/14
[52] U.S. Cl. ........................... 52/20; 52/169.5; 52/220.8; 52/219; 404/25; 404/26; 277/202
[58] Field of Search .................................. 52/19, 20, 218, 52/219, 220.8, 302.1, 169.5; 137/363, 97, 98; 405/41, 52, 150.1; 404/25, 26; 277/212 FB, 202

[56] References Cited

U.S. PATENT DOCUMENTS

| | | | |
|---|---|---|---|
| 4,469,467 | 9/1984 | Odill et al. | 404/25 |
| 4,803,816 | 2/1989 | Klober | 52/219 |
| 5,299,596 | 4/1994 | D'Alessandro | 137/363 |
| 5,358,002 | 10/1994 | D'Alessandro | 137/363 |
| 5,496,128 | 3/1996 | Odill | 404/25 |

*Primary Examiner*—Christopher Todd Kent
*Assistant Examiner*—Yvonne Horton-Richardson
*Attorney, Agent, or Firm*—Whitham, Curtis & Whitham

[57] ABSTRACT

A synthetic resin tubular body is fitted into the pipe connecting hole of a handhole when used. The cut edge face at one open end side of the tubular body having square walls in cross section and circular walls in cross section which are alternately disposed in its axial direction is the boundary portion between a side wall portion forming the square wall in cross section and a peripheral wall portion forming the square wall in cross section, and is cut in the boundary portion on the side apart from the open end side or in the proximity thereof. The length of the tubular body is set greater than the wall thickness of the handhole. In addition to the tubular body, a block body for the tubular body is formed with square and circular recessed portions conforming to the outer peripheral face of the open end side portion of the tubular body. Further, a handhole is such that the cut edge face of the tubular body and the inner wall surface of the handhole are arranged substantially on the same plane, and the other end side portion of the tubular body being projected outside the handhole, and besides the tubular body or the block body is watertightly fixed by a curing filler such as cement mortar or gelation resin filled in the pipe connecting hole.

5 Claims, 9 Drawing Sheets

CONNECTING TUBULAR BODY FOR HANDHOLE OR MANHOLE, BLOCK BODY FOR THE TUBULAR BODY, AND HANDHOLE OR HANDHOLE STRUCTURE

BACKGROUND OF THE INVENTION

The present invention relates to a handhole, a manhole or the like for use as an electric wire junction when an underground conduit line is formed for an electric wire, and to a tubular body to be connected to such a handhole or a manhole.

Conventionally, in order to form an electric wire conduit line by coupling a tubular body to an electric wire junction such as a handhole, a manhole or the like of the sort mentioned above (hereinafter generally referred to as a handhole), it has been arranged that a tapered tubular member called a bell mouth separately formed is inserted in and coupled to the opening of the tubular body so as to use the bell mouth as a member forming the end of the opening of the tubular body.

The operation of passing the electric wire through the tubular body has been impossible to perform smoothly unless the bell mouth is inserted in and coupled to the opening of the tubular body because the electric wire is brought into contact with the peripheral edge portion of the opening of the tubular body with the result that the resistance increases. Therefore, it has been necessary to prepare the bell mouth separately from the tubular body used to form the conduit line and transport the bell mouth to the jobsite. Moreover, the operation of coupling the bell mouth to the opening of the tubular body is necessitated in order that the bell mouth is not easily slipped off the opening thereof.

SUMMARY OF THE INVENTION

An object of the present invention is to solve the problems developed from means for forming a conduit line using such a conventional bell mouth as described above, and to provide a tubular body which doesn't need to use a bell mouth, a handhole coupled with tubular bodies in its opening by using such a tubular body, and a block body capable of readily forming conduit lines with a predetermined distance for the handhole.

A tubular body according to the present invention is fitted into the pipe connecting hole of a handhole when used, wherein the cut edge face on one open end side of a synthetic resin tubular body having square (in this specification, the term "square" includes also the meaning of "rectangular") walls in cross section and circular walls in cross section which are alternately disposed in its axial direction is the boundary portion between a side wall portion forming the square wall in cross section and a peripheral wall portion forming the square wall in cross section, and is cut in the boundary portion on the side apart from the open end side or in the proximity thereof, and wherein the length of the tubular body is set greater than the wall thickness of the handhole.

A block body for the tubular body has fitting recessed portions formed of alternately and axially disposed square and circular recessed portions 22 and 23 conforming to the outer peripheral face of the open end side portion of the tubular body, and the block body is constituted by two unit block bodies split in the circumferential direction of the recessed portions.

A handhole comprises a connecting tubular body constructed such that the cut edge face on one open end side of a synthetic resin tubular body having square walls in cross section and circular walls in cross section which are alternately disposed in its axial direction is the boundary portion between a side wall portion forming the square wall in cross section and a peripheral wall portion forming the square wall in cross section, the tubular body being cut in the boundary portion on the side apart from the open end side or in the proximity thereof; the cut edge face and the inner wall surface of the handhole are arranged substantially on the same plane, the other end side portion of the tubular body being projected outside the handhole; and the outer peripheral face of the tube wall continuous to the cut edge face is watertightly fixed in the pipe connecting hole of the handhole, the pipe connecting hole being filled up with a curing filler such as cement mortar or gelation resin.

In order to practice the invention thus constituted, that is, the invention in the form of the aforesaid tubular body, for example, the cut edge face of a tubular body and one side face of a block body are arranged substantially on the same plane, and the other end side portion of the tubular body is projected outward from the other side face of the block body, so that the block body is fixed to the tubular body. In this case, the block body may be integrally secured to the tubular body, or two split-type block bodies separately formed may be used for putting the tubular body therebetween. Moreover, the block body may be so structured as to form a plurality of parallel coupling holes for use in coupling together a plurality of parallel tubular bodies.

When the aforesaid handhole is practiced, the tubular body 1 is constructed such that the cut edge face on one open end side of the synthetic resin tubular body having square walls in cross section and circular walls in cross section which are alternately disposed in its axial direction is the boundary portion between a side wall portion forming the square wall in cross section and a peripheral wall portion forming the square wall in cross section, and the boundary portion on the side apart from the open end side is cut. Further, the tubular body is fixed to the block body such that the cut edge face of the tubular body and one side face of the block body are arranged substantially on the same plane, and the other end side portion of the tubular body is projected outward from the other side face of the block body. Moreover, the cut edge face and the inner wall surface of the handhole are arranged substantially on the same plane, and the other end side portion of the tubular body is projected outside the handhole. The outer peripheral face of the block body is watertightly fixed in the pipe connecting hole of the handhole, the pipe connecting hole being filled up with a curing filler such as cement mortar or gelation resin.

DETAILED DESCRIPTION OF THE INVENTION

Figure 1:
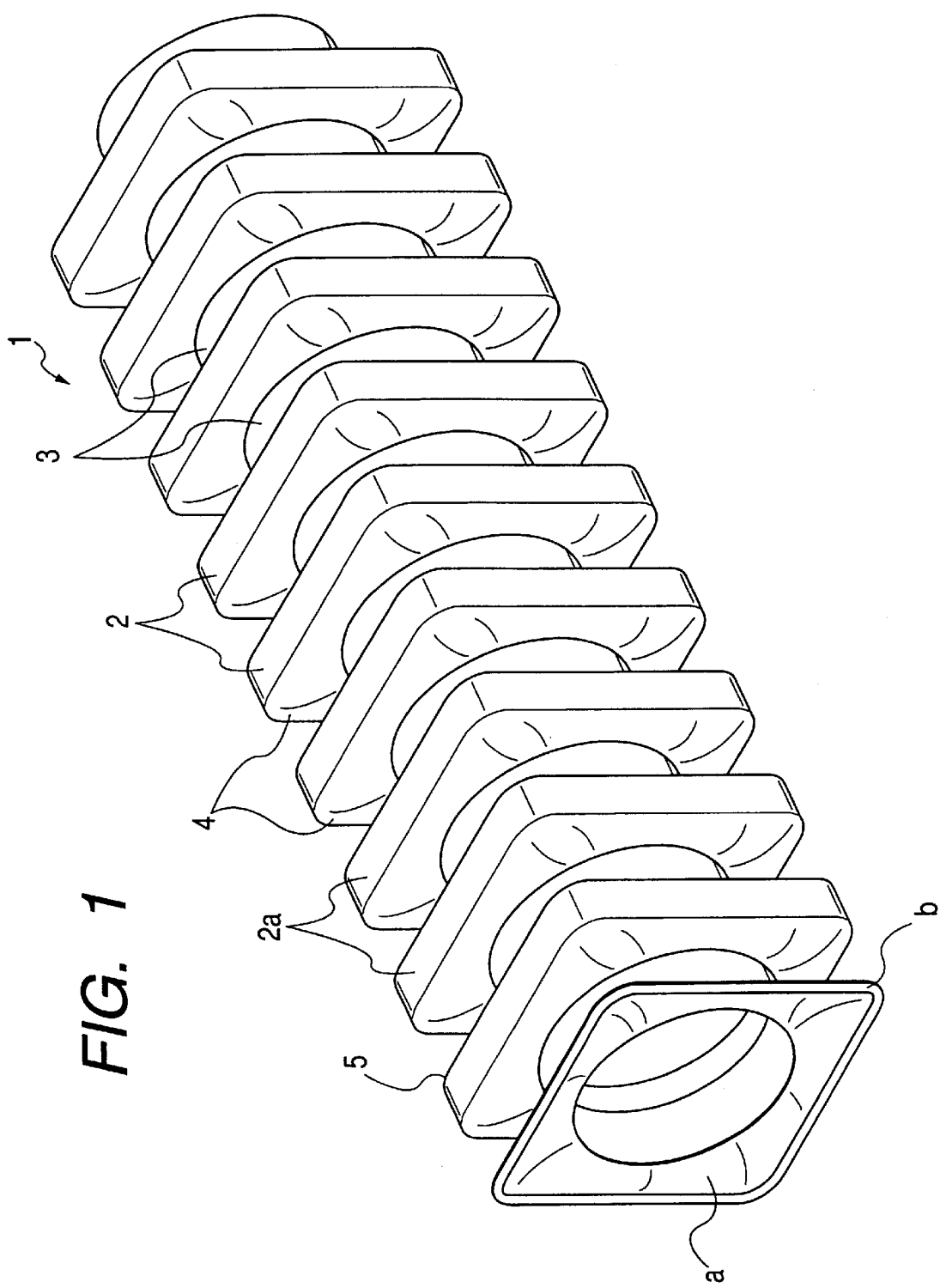
FIG. 1 is a perspective view of a tubular body as a first embodiment of the present invention.
Figure 2:
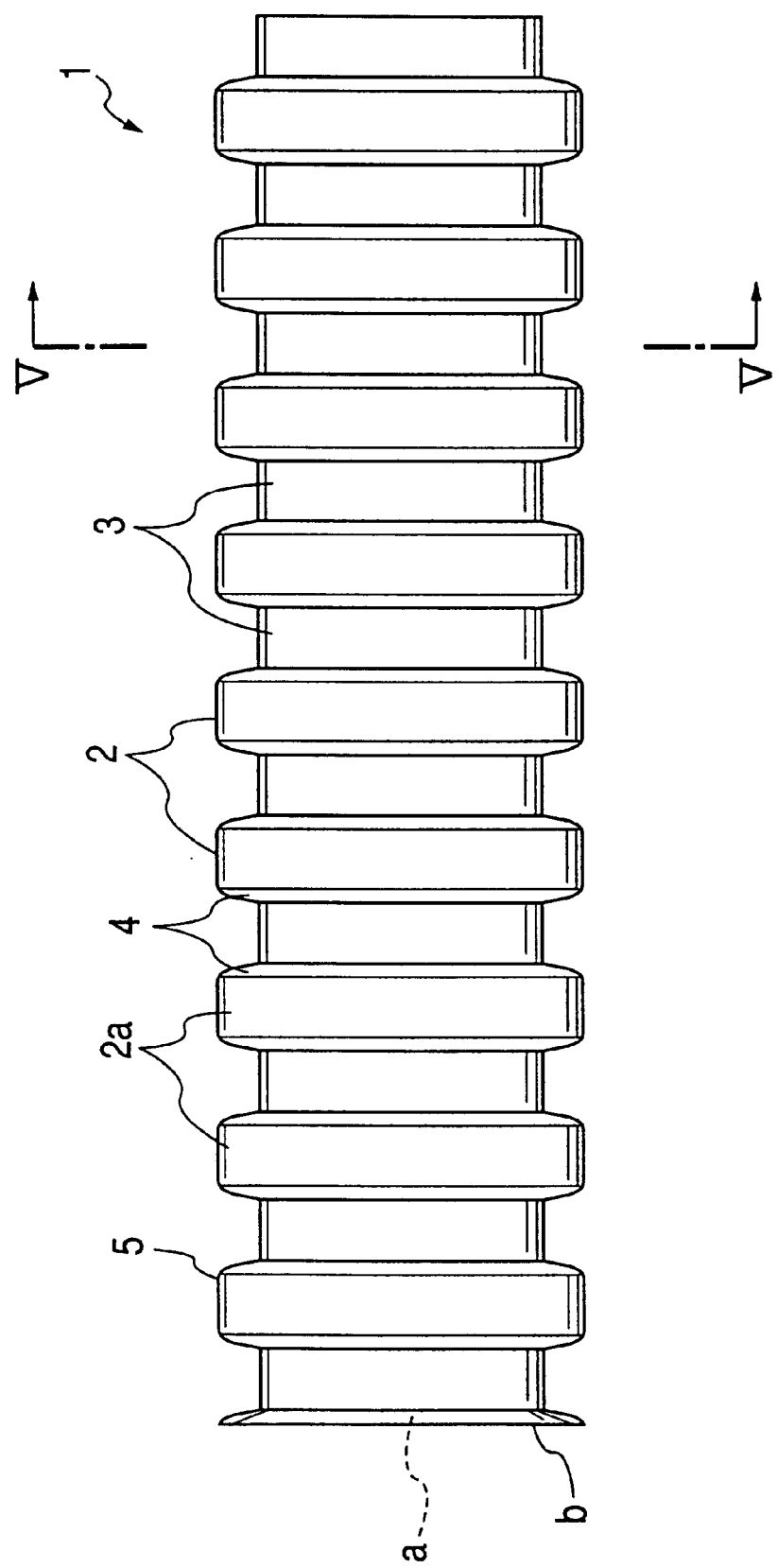
FIG. 2 is a top view of the tubular body of FIG. 1.
Figure 3:
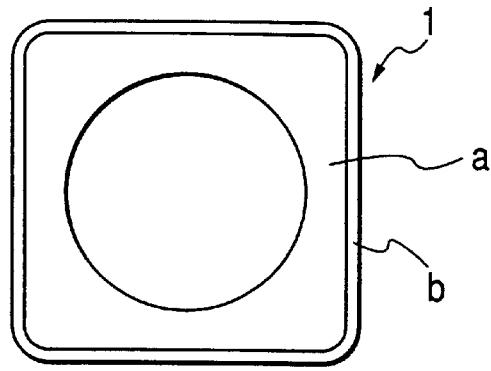
FIG. 3 is a leftside view of FIG. 2.
Figure 4:
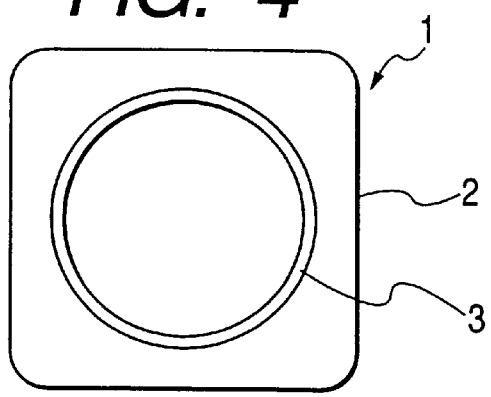
FIG. 4 is a rightside view of FIG. 2.
Figure 5:
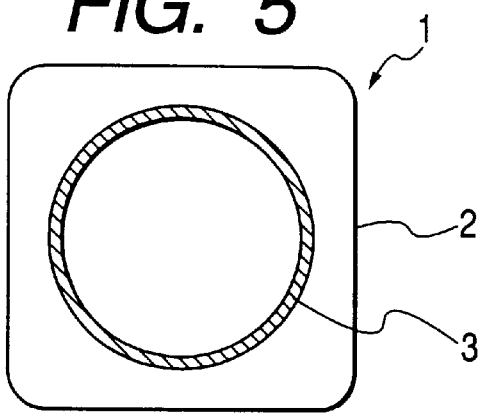
FIG. 5 is a sectional view taken along line V—V of FIG. 2.
Figure 6:
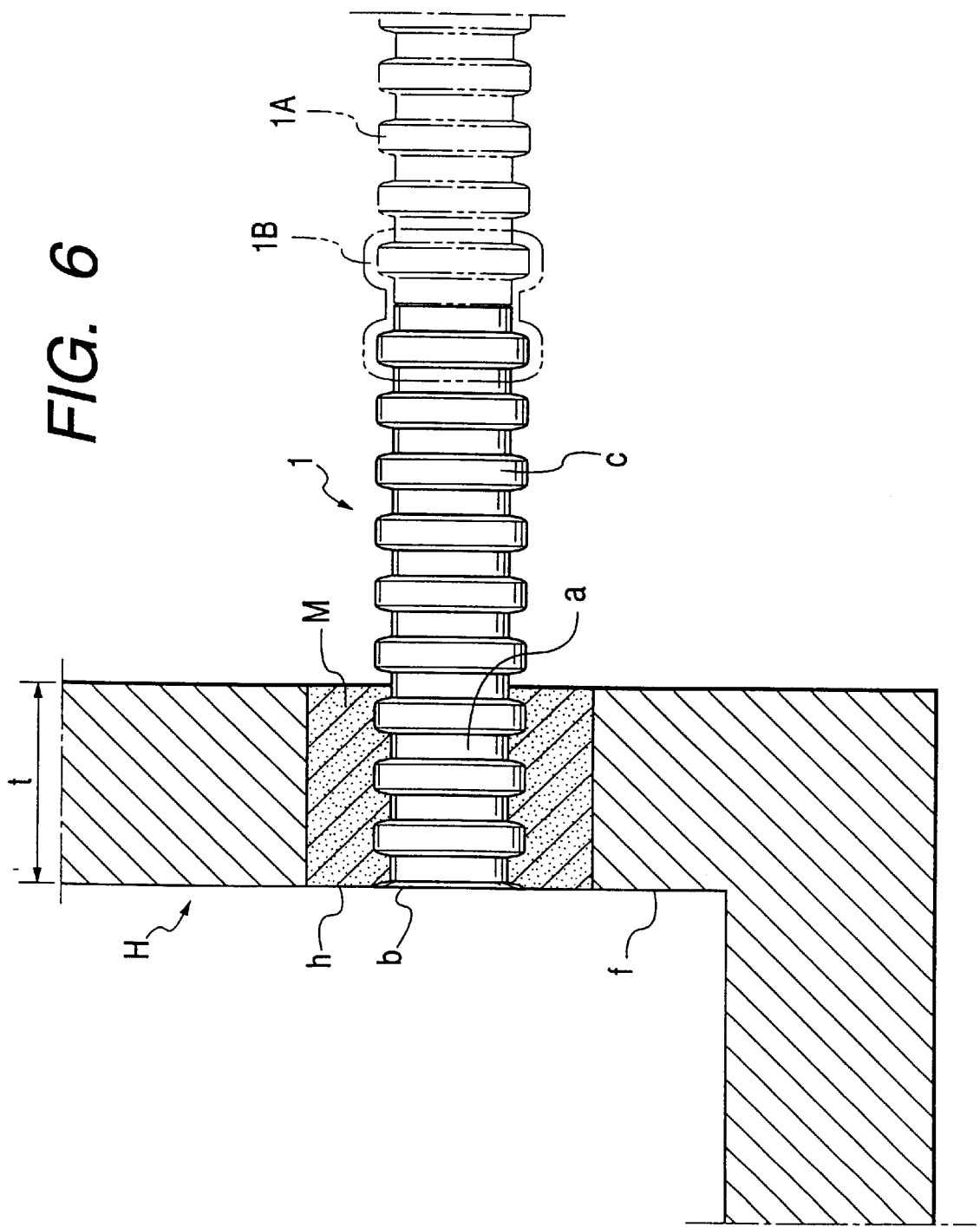
FIG. 6 is a side view showing the tubular body of FIG. 1 in working mode.

The preferred embodiments of the present invention will be described in detail with reference to the drawings. FIGS. 1–6 illustrate a first embodiment of a tubular body of the present invention. FIG. 1 is a perspective view showing the overall configuration of the tubular body; FIG. 2 is a front view of the tubular body; FIGS. 3–4 show the edge faces thereof; FIG. 5 is a sectional view of the tubular body in FIG. 2; and FIG. 6 shows the tubular body in working mode.

The tubular body 1 shown in FIGS. 1–5 is, as shown in FIG. 6, a synthetic resin tubular body to be fitted into the pipe connecting hole "h" of a handhole H or a manhole serving as an electric wire or a telephone line junction. The tubular body 1 has square walls 2 which are substantially square in cross section and circular walls 3 which are substantially round in cross section, both walls being alternately disposed in the axial direction of the tubular body. The cut edge face "b" on one open end "a" side (left-hand side in FIGS. 1–2) of the synthetic resin tubular body 1 is the boundary portion between a side wall portion 4 forming the square wall 2 in cross section and a peripheral wall portion 2a forming the square wall 2 in cross section, and so structured as to be cut in the boundary portion 5 on the side apart from the open end "a" side. Further, the length of the tubular body 1 is, as shown in FIG. 6, set about three times as great as the wall thickness "t" of the handhole H. The cut part in this case may be a part tightly along the boundary portion 5 apart from the open end "a" side or where the cutting is carried out in a part from the part along the boundary portion up to the substantially intermediate portion in the axis direction of the tube in the peripheral wall portion 2a of the square wall.

In order to use such tubular body 1 as an electric wire conduit line, it is connected to the handhole H. One of the means of use is, as shown in FIG. 6, to arrange the cut edge face "b" on the open end "a" side of the tubular body 1 and the inner wall surface "f" of the handhole H substantially on the same plane, and the other end side portion "c" of the tubular body 1 is projected outside the handhole H so as to dispose a portion on the open end "a" side continuous to the cut edge face "b" in the pipe connecting hole "h" of the handhole H. The gap between the outer peripheral face of the tubular body 1 and the inner peripheral face of the pipe connecting hole "h" of the handhole H is filled up with a curing filler M such as cement mortar and when the curing filler M is hardened, the tubular body 1 is watertightly secured to the handhole H.

More specifically, as shown by an imaginary line of FIG. 6, another conduit line 1A is laid on the outer end side of the tubular body 1 in the direction in which the tubular body 1 is extended, and both conduit lines are coupled together by means of a connector 1B. In this way, a series of conduit lines is formed up to the next handhole.

Figure 7:
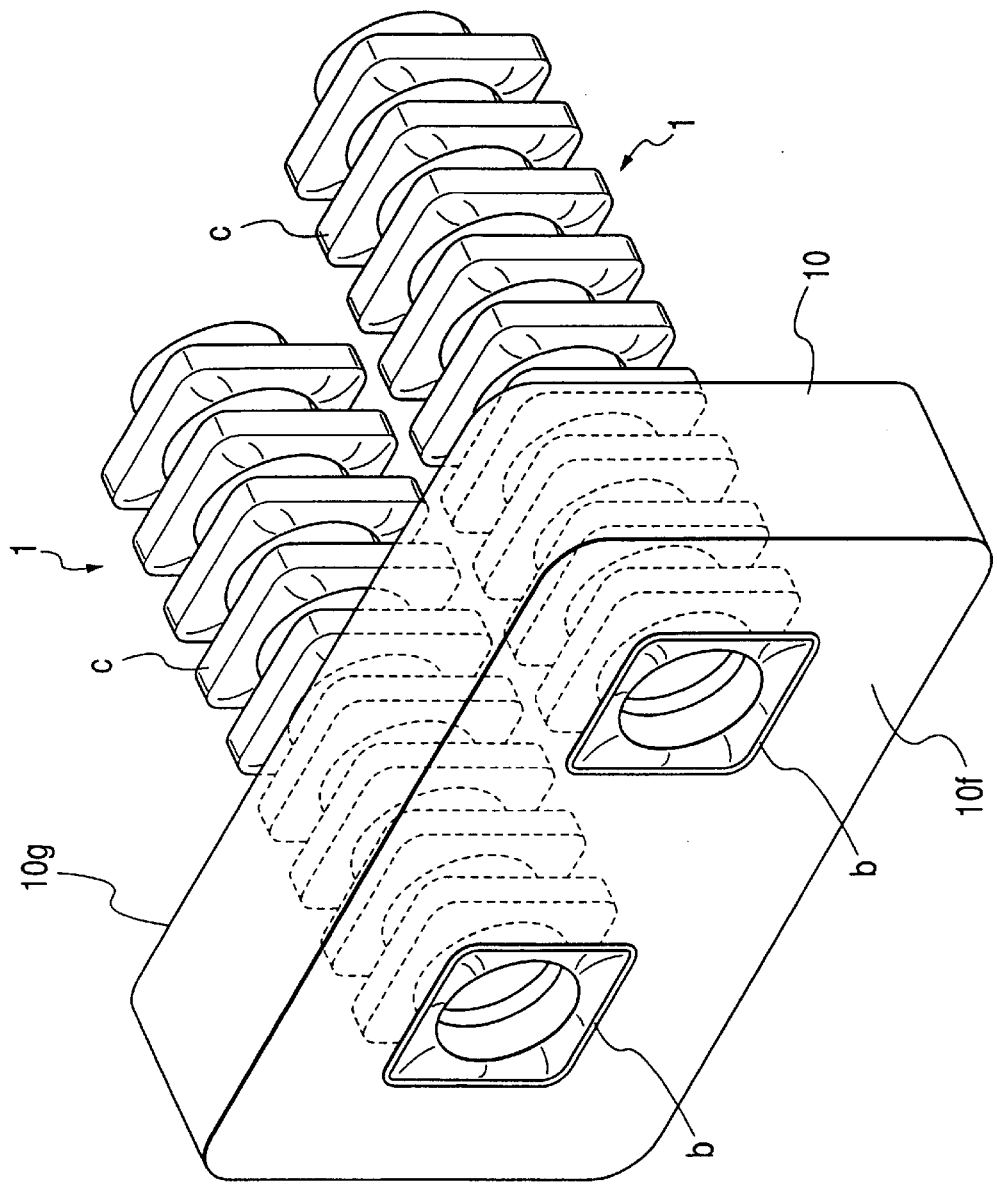
FIG. 7 is a perspective view of a tubular body as another embodiment.

Figures to be subsequently described refer to other embodiments. Referring to FIG. 7, two tubular bodies 1, 1 are laterally disposed in parallel. The cut edge faces b, b of the respective two tubular bodies 1, 1, which are respectively structured as previously noted, and one side face 10f of the synthetic resin block body 10 which is substantially rectangular are arranged substantially on the same plane. The other end side portions c, c of the respective tubular bodies 1, 1 are projected outward from the other side face 10g of the block body 10, so that the block body 10 and the tubular bodies 1, 1 are combined together into one body. Although the tubular body 1 in this case is formed from two of them combined together, it may be formed from one or more than two of them.

Figure 8:
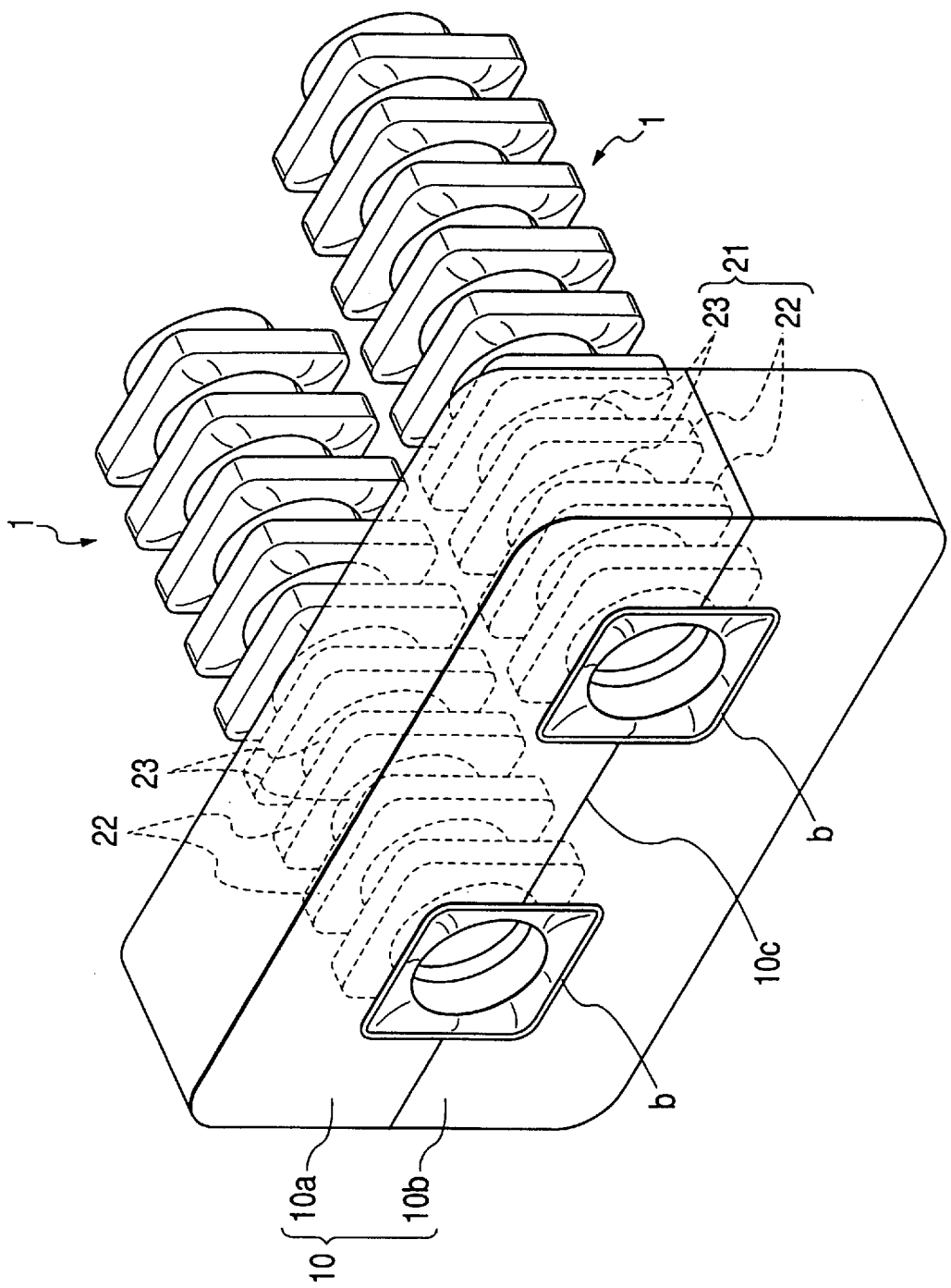
FIG. 8 is a perspective view of a tubular body as still another embodiment.

It is not necessarily essential to combine the tubular body 1 and the block body 10 together into one body but may also acceptable to employ, for example, a vertically split type block body 10 comprising unit block bodies 10a, 10b as shown in FIG. 8. In other words, the block body 10 has fitting recessed portions 21 resulting from alternately and axially disposing square recessed portion 22 and circular recessed portion 23, which conform to the outer peripheral face of the open end "a" side portion of the tubular body 1 to be coupled, between the opposite faces 10c of the split block bodies 10a, 10b. Two rows of fitting recessed portions 21 are formed in parallel in this embodiment. With this block body 10, the tubular bodies 1, 1 are fitted in between the two split unit block bodies 10a, 10b. In this case, an adhesive may be used if the block body 10 and the tubular body 1 have to be tightly secured together.

Figure 9:
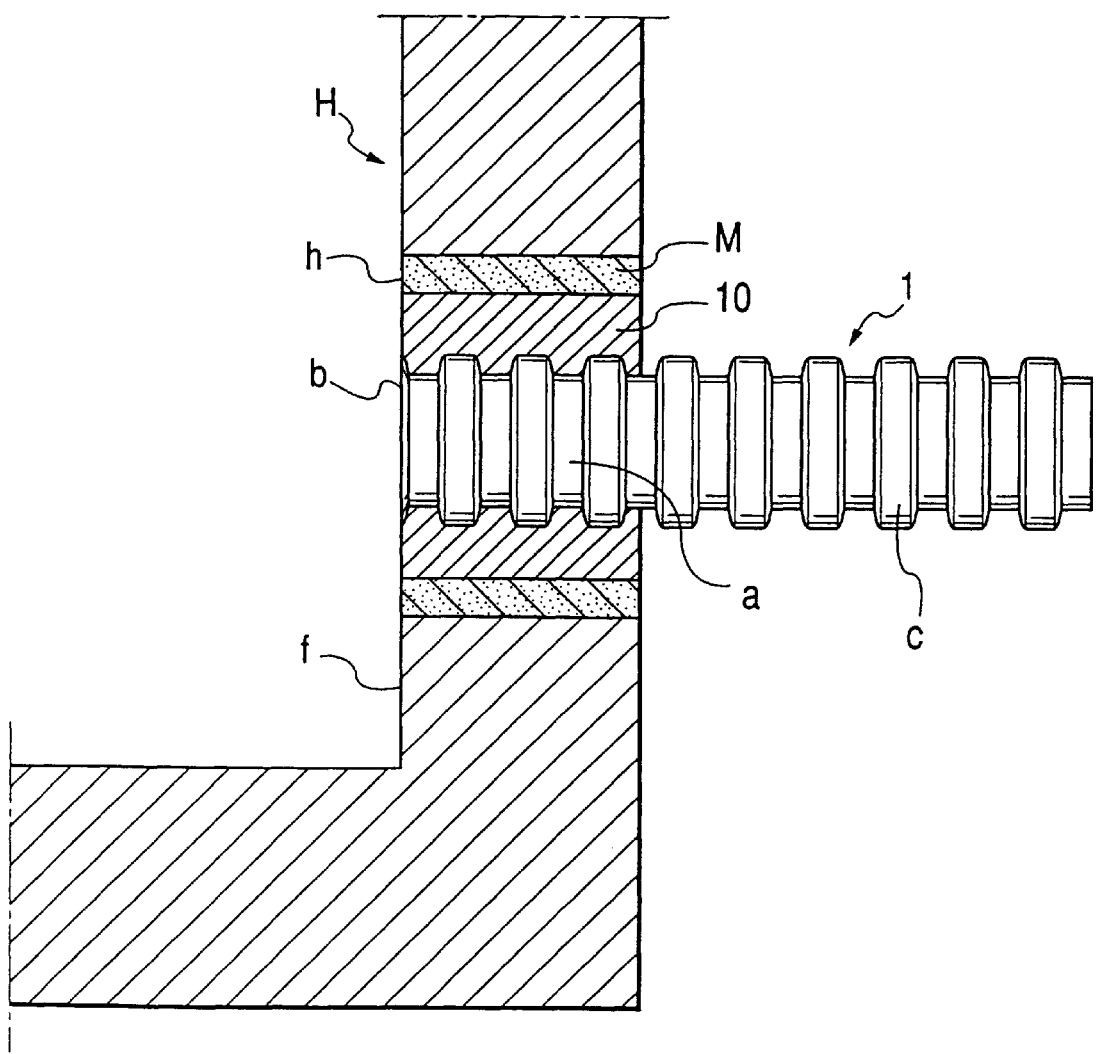
FIG. 9 is a side view of the tubular bodies of FIGS. 7, 8 in working mode.
Figure 10:
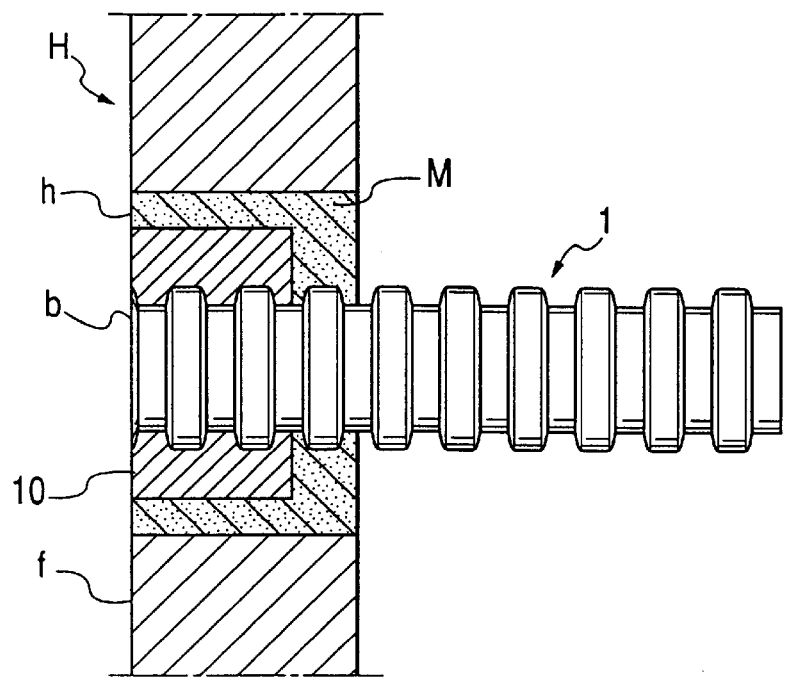
FIG. 10 is a side view of the tubular body of FIG. 9 in another working embodiment.
Figure 11:
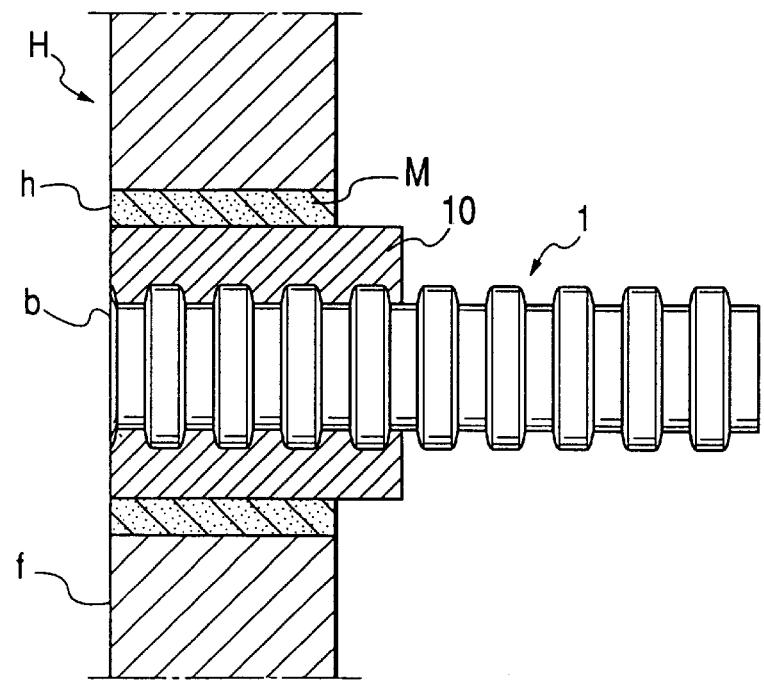
FIG. 11 is a side view of the tubular body of FIG. 9 in still another working mode.

FIGS. 9–11 refer to cases where the tubular body 1 secured or fixed to the block body 10 as shown in FIGS. 7, 8 has been coupled to the handhole H; namely, FIG. 9 refers to a case where the width of the block body 10 is set substantially equal to the wall thickness of the handhole H; FIG. 10 to a case where the width of the block body 10 is set narrower than the wall thickness of the handhole H; and FIG. 11 to a case where the width of the block body 10 is set greater than the wall thickness of the handhole H. Also in these cases, one side face 10f of the block body 10 made to substantially conform to the cut edge face "b" on the one open end "a" side of the tubular body 1 is arranged so that the side face 10f is positioned on the substantially same surface as the inner wall surface "f" of the handhole H, and the outer peripheral face of the block body 10 is watertightly fixed in the pipe connecting hole "h" of the handhole H even in these cases, the pipe connecting hole "h" being filled up with a curing filler M such as cement mortar or gelation resin.

Figure 12:
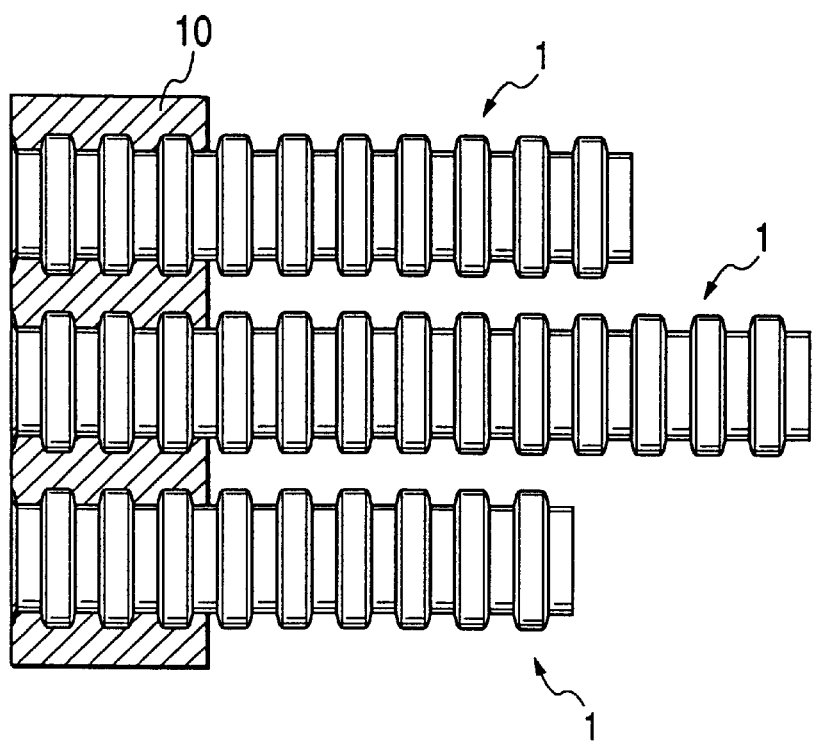
FIG. 12 is a plan view of a tubular body as still another embodiment.
Figure 13:
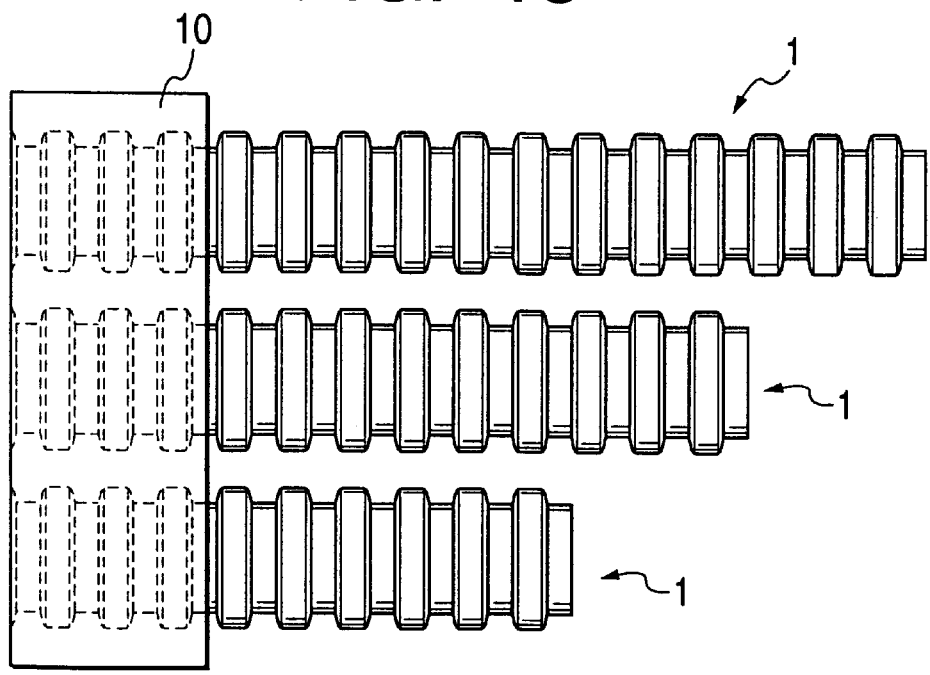
FIG. 13 is a plan view of a tubular body as still another example.

FIGS. 12–13 show still other embodiment. In each of these embodiments, there is shown one block body 10 which is used for laterally arranging and coupling three tubular bodies 1, 1, 1. As shown in FIG. 12, a long tubular body 1 is disposed in the central position, whereas a shorter tubular body 1 is disposed on both sides of the long one. When extended conduit lines are respectively coupled to these tubular bodies, such a conduit line is first coupled to the central tubular body in order to prevent the work of coupling another conduit line to any one of the remaining tubular bodies from being interfered. As shown in FIG. 13, three tubular bodies 1, 1, 1 different in length are employed and the longest one is placed in the uppermost position with shorter ones being situated downward in order, so that when the work of coupling conduit lines is done by an operator from below, the previously coupled conduit line is prevented from impeding the work of coupling the next conduit line thereunder.

With respect to the length of the tubular body 1 according to the present invention, not only relatively short tubular bodies shown in the drawings but also any other longer one may directly be used. As the material of the tubular body 1, any other synthetic resin can be used in addition to preferably polyolefin resin such as polyethylene and polyvinyl chloride excellent in weather resistance. Further, the two unit blocks separated in the circumferential direction need not be divided from a place where the recessed portion is divided into two equal parts as shown in FIG. 8 but may be arranged otherwise as long as the tubular body 1 is clamped. A plurality of stages of tubular bodies may also be coupled together by stacking them.

Although a description has been given of representative working embodiments according to the present invention, the invention is not limited to the exemplary structures but may be modified on condition that the aforesaid component requirements and objects thereof are achieved within the range of effects enumerated below.

As is obvious from the description above, the tubular body according to the present invention is so structured as to have the square walls in cross section and circular walls in cross section alternately disposed, and the cut edge face of the tubular body at the side used to be coupled to a pipe connecting hole of the handhole is cut in just the boundary portion between a side wall of both side wall portions forming the square wall in cross section in the axial direction of the tube, which is apart from the open end, and a circumferential wall portion forming the square wall, or cut in the proximity thereof. Therefore, since the opening itself of the tubular body forms a guide body when an electric wire is passed therethrough and the circular wall portion in cross section contacts and supports the electric wire, the advantage is that the work of fitting the electric wire into the tubular body is extremely smoothly carried out with the least frictional resistance. Moreover, since no bell mouth is required to be formed separately, only the tubular body is required to be conveyed at the time of coupling work. Thus the work of fitting the bell mouth to the tubular body can be omitted. In addition, the tubular body it self can be extremely stably disposed in an excellent posture because of the presence of square walls in cross section.

The block body according to the present invention has the fitting recessed portions resulting from alternately and axially disposing the square recessed portions and circular recessed portions, which conform to the outer peripheral face of the open end side portion of the tubular body, and is constituted by two unit block bodies divided in the circumferential direction. Thus the advantage is that the tubular body is made usable by fitting it into the recessed portion in the required place and that the tubular bodies can be positioned with a predetermined distance held among them by means of the block body stably in a fixed posture.

Since the handhole according to the present invention is arranged so that the tubular body itself is watertightly secured in the pipe connecting hole of the handhole directly or via the block body with the curing filler such as cement mortar or gelation resin, there is no fear that a member such as the bell mouth falls down from the tubular body or becomes loose. Especially, since the electric wire can be directly inserted into and through the tubular body, and the tube diameter is free from local reduction due to the mounting of the bell mouth at the entrance and exit of the wire passageway, the effect of making usable a tubular body having an adequate diameter can be expected.

What is claimed is:

1. A connecting tubular body for a handhole or manhole which is fitted into a pipe connecting hole of the handhole or manhole when used, comprising:

a synthetic resin tubular body having square walls in cross section and circular walls in cross section which are alternately disposed in its axial direction, wherein a cut edge face at one open end side of the synthetic resin tubular body is cut in a boundary portion between a side wall portion of the square wall and a peripheral wall portion of the square wall or in the proximity of the boundary portion, the boundary portion being positioned at a side apart from the open end side, and wherein a length of the tubular body is larger than a wall thickness of the handhole or manhole.

2. A connecting tubular body for a handhole or manhole as defined in claim 1, further comprising a block body fixed to the tubular body, wherein the cut edge face of the tubular body and one side face of the block body are arranged substantially on the same plane, and the other end side portion of the tubular body is projected outward from the other side face of the block body.

3. A block body of a connecting tubular body for a handhole or manhole, having fitting recessed portions constituted by alternately and axially disposed square and circular recessed portions, the fitting recessed portions being fitted to an outer peripheral face of an open end side portion of the tubular body as defined in claim 1, wherein the block body includes two unit block bodies split in a circumferential direction of the fitting recessed portions.

4. A handhole or manhole structure, comprising:

a connecting synthetic resin tubular body having square walls in cross section and circular walls in cross section which are alternately disposed in its axial direction, a cut edge face at one open end side of the synthetic resin tubular body being cut in a boundary portion between a side wall portion of the square wall and a peripheral wall portion of the square wall or in the proximity of the boundary portion, and the boundary portion being positioned at a side apart from the open end side; and a hand hole, the cut edge face of the tubular body and an inner wall surface of the handhole or manhole being arranged substantially on the same plane, and the other end side portion of the tubular body being projected outward from the handhole or manhole;

wherein an outer peripheral face of a pipe wall of the tubular body continuous to the cut edge face is watertightly fixed in a pipe connecting hole of the handhole or manhole by a curing filler such as cement mortar or gelation resin filled in the connecting hole.

5. A handhole or manhole structure, comprising:

a connecting synthetic resin tubular body having square walls in cross section and circular walls in cross section which are alternately disposed in its axial direction, a cut edge face at one open end side of the synthetic resin tubular body being cut in a boundary portion between a side wall portion of the square wall and a peripheral wall portion of the square wall or in the proximity of the boundrary portion, and the boundary portion being positioned at a side apart from the open end side;

a block body fixed to the tubular body, the cut edge face of the tubular body and one side face of the block body being arranged substantially on the same plane, and the other end side portion of the tubular body being projected outward from the other side face of the block body; and a hand hole, the cut edge face of the tubular body and an inner wall surface of the handhole or manhole being arranged substantially on the same plane, and the other end side portion of the tubular body being projected outward from the handhole or manhole, wherein an outer peripheral face of the block body is watertightly fixed in a pipe connecting hole of the handhole or manhole by a curing filler such as cement mortar or gelation resin filled in the connecting hole.

* * * * *